United States Patent [19]

Liu et al.

[11] Patent Number: 4,634,598

[45] Date of Patent: * Jan. 6, 1987

[54] FLAVORANT CAPSULES

[75] Inventors: Richard T. Liu, Worthington; Winston R. Nickerson; Charles H. Anderson, both of Marysville, all of Ohio

[73] Assignee: Nestec S. A., Vevey, Switzerland

[*] Notice: The portion of the term of this patent subsequent to Mar. 18, 2003 has been disclaimed.

[21] Appl. No.: 769,852

[22] Filed: Aug. 26, 1985

Related U.S. Application Data

[63] Continuation of Ser. No. 333,172, Dec. 21, 1981, Pat. No. 4,576,826, which is a continuation-in-part of Ser. No. 203,389, Nov. 3, 1980, abandoned, which is a continuation of Ser. No. 931,503, Aug. 7, 1978, abandoned.

[51] Int. Cl.$^4$ .......................... A23L 1/221; A23F 3/40; A23F 5/46
[52] U.S. Cl. .................................... 426/650; 426/651; 426/594; 426/96; 426/98; 426/597
[58] Field of Search ................... 426/96, 98, 594, 385, 426/386, 388, 289, 295, 650, 651, 597

[56] References Cited

U.S. PATENT DOCUMENTS

| | | | |
|---|---|---|---|
| 2,947,634 | 8/1960 | Feldman et al. | 426/594 |
| 3,551,166 | 12/1970 | Baum et al. | 426/98 |
| 3,565,635 | 2/1971 | Mahlmann | 426/289 |
| 3,687,683 | 8/1972 | Kaplan et al. | 426/594 X |
| 3,769,032 | 10/1973 | Lubsen et al. | 426/386 X |
| 3,809,766 | 5/1974 | Stolz | 426/385 X |
| 3,809,770 | 5/1974 | Jolly et al. | 426/385 X |
| 3,917,858 | 11/1975 | Bos | 426/388 |
| 3,989,852 | 11/1976 | Palmer | 426/289 |
| 4,044,167 | 8/1977 | Jolly et al. | 426/386 X |
| 4,076,847 | 2/1978 | Johnston et al. | 426/96 X |

FOREIGN PATENT DOCUMENTS

| | | | |
|---|---|---|---|
| 1145635 | 1/1969 | United Kingdom | 426/594 |

Primary Examiner—Joseph Golian
Attorney, Agent, or Firm—Vogt and O'Donnell

[57] ABSTRACT

Processes for the production of flavorant capsules containing aromatic and/or flavor principles of food materials are disclosed. The flavorant capsules produced by these processes are also disclosed.

2 Claims, No Drawings

FLAVORANT CAPSULES

CROSS-REFERENCE TO RELATED APPLICATIONS

This is a continuation of application Ser. No. 333,172, filed Dec. 21, 1981, now U.S. Pat. No. 4,576,826 which in turn is a continuation-in-part of application Ser. No. 203,389, filed Nov. 3, 1980, now abandoned which in turn is a continuation of application Ser. No. 931,503 filed Aug. 7, 1978 now abandoned.

BACKGROUND OF THE INVENTION

1. Field of the Invention

This invention pertains to the field of food flavorant capsules. More particularly, the present invention is concerned with the preparation of capsules in which there are contained aromatic and/or flavor components of a food material, which components are encapsulated before the possible loss or deterioration of these components, retained without degradation and subsequently released when desired, usually just prior to consumption of the ultimate product in which these capsules are contained.

2. Description of the Prior Art

In the preparation of various food products, for example, instant foods such as instant coffee, instant soups, instant cold drinks, instant desserts, etc., the desirability of retaining the flavor and/or aromatic constituents of these foods for a considerable length of time without their loss or deterioration until the food product is consumed has long been recognized.

Thus, essential oils, both cold pressed and concentrated, such as those of lemon, orange, lime, etc., are widely used as flavoring and scenting materials in the preparation of various consumer products. However, due to the extreme sensitivity of these oils to the action of heat, light, air and moisture, it has been very difficult to preserve the fresh fruit aroma and flavor of these essential oils when present in these various consumer products.

Similarly, other natural and synthetic flavors which consist of various combinations of alcohols, aldehydes, ketones, esters, etc., are liquids which are highly volatile and are also extremely sensitive to oxidation by atmospheric oxygen. Due to the aforementioned volatility, many of these extracts lose some of their original flavor or aroma or both upon storage alone or when employed in a consumer product. Moreover, because of the liquid nature of these flavoring materials, they also do not readily lend themselves for combination with solids or powders.

In the preparation of instant coffee, attempts have been made to incorporate the aroma principles of freshly roasted coffee by, for example, spraying them onto the surface of dried coffee extract as an emulsion with coffee oil. Careful sealing of the aromatized dried coffee is required, however, to prevent escape of the aroma. After the container is opened though, it is not too long before the aroma is lost in any event.

Encapsulation of coffee aroma has been investigated as a means for containing this aroma for long periods of time in instant coffee. Gums have been used for that purpose, but such use involves the introduction of extraneous matters into coffee. Coffee powder, too, has been used to prepare capsules filled with coffee solids impregnated with coffee aroma. In both cases, the amount of encapsulated aroma is rather low and this necessitates the addition of a relatively high proportion of capsules to the instant coffee.

Moreover, the techniques and/or materials that may be employed in retaining the flavor and/or aromatic components of one food may not necessarily be applicable to another food where the presence of such extraneous material or the implementation of particular process steps may be totally undesirable.

SUMMARY OF THE INVENTION

Applicants have discovered a process for producing flavorant capsules which is both efficient and economical and which effectively encapsulates flavor and/or aromatic principles of a food material such that these principles can be stored without their loss or deterioration for a considerable length of time and yet can easily be released whenever it is so desired.

Moreover, the capsules of the present invention are able to contain a large quantity of encapsulated aroma and/or flavorant principles such that a correspondingly lower amount of these capsules are required to be employed in the ultimate consumer product.

The process for preparing the flavorant capsules of the present invention comprises first forming a stable emulsion of an edible oil and an aqueous essence. This emulsion is then directly sprayed or dropped in a dropwise manner onto an agitated powdered edible protein material, an agitated powdered edible carbohydrate material or an agitated powdered edible material comprised of a combination of proteins and carbohydrates which material forms the walls or shell of the desired capsules. In an alternative embodiment, the emulsion is treated so as to form frozen particles thereof and is added to the agitated powdered wall material. After the powdered material has been further agitated, the resultant capsules comprising a hardened shell of edible material surrounding a droplet of edible oil containing flavor and/or aroma principles are collected.

In yet another embodiment of the present invention, where the presence of oil is objectionable in the consumer product where the capsules are to be employed such as in instant drinks, fruit cocktail, etc., the process of the present invention is modified in that capsules are made without the employment of oil. Such a process comprises employing only the aqueous essence itself which is added to the agitated edible powdered wall material in frozen, particulated form. After further agitation, capsules having the flavor and/or aromatic principles impregnated in the hardened shell of edible material surrounding a hollow core are collected.

Capsules prepared by the process of the present invention may have a variety of dimensions ranging from an average diameter of 250–600 $\mu$m (30–60 U.S. Standard Mesh) up to about 2.0–3.5 mm (6–8 U.S. Standard Mesh) and have a wall thickness in the range of from about 20 to 400 $\mu$m. Analyses of these capsules have demonstrated that they have highly impervious walls which is an essential prerequisite for long term aroma and flavor retention. The capsules maintain their integrity and retention of the encapsulated material for about twelve months without any apparent degradation of quality.

DETAILED DESCRIPTION OF THE INVENTION

Where the presence of oil is not objectionable in the ultimate consumer product in which the capsules are to be employed, the initial step in the encapsulation procedures of the present invention is the preparation of a stable emulsion.

The emulsion is prepared by combining an edible oil with an aqueous essence. Generally, the flavor and/or aromatic principles to be encapsulated and protected from the environment will be introduced into the emulsion as part of the aqueous essence. There will be times though when the material to be protected from degradation and physical loss will be the edible oil itself. However, inasmuch as the presence of water is necessary for the formation of a satisfactory capsule shell in all of the processes of the present invention, water or, if desired, water containing additional flavorants or aromatics is added to such edible oil to form an emulsion. Accordingly, the term "aqueous essence" as it is employed throughout the present Specification may simply be water or water (or a suitable juice) combined with natural or artificial flavorants and/or aromatics.

More particularly, the aqueous essence of the present invention may comprise flavorants and/or aromatics derived from fruit, meat, seafood, spices, vegetables, etc. These flavor and/or aromatic principles may be natural or artificial and may include oil of lemon, oil of orange, oil of lime, natural fruit flavors such as strawberry, raspberry, cherry, etc., or a synthetic flavor such as oil of wintergreen, ethyl acetate, ethyl malate, amyl acetate, etc. Distillates of tea, coffee, chocolate, etc., may also be employed. The flavor and/or aromatic principles, both natural and/or artificial, of chicken, shrimp, fish, ham, lobster, soup greens, leek, onions, carrots, bacon, roast beef, etc., are also all applicable in the process of the present invention. Where a particular flavorant and/or aromatic principle is not aqueous in nature, water or a suitable juice is added to the flavorant in order to produce the aqueous essence.

The edible oil that is employed in the process of the presently claimed invention may be obtained from a variety of different sources. Such oils include, but are not limited to, safflower oil, peanut oil, corn oil, coffee oil, olive oil, soybean oil, linseed oil, cottonseed oil, sesame seed oil, and oil derived from other vegetable sources. Other oils that may also be employed include, but are not limited to, animal fractions such as butter oil and the like and oils derived from fowl, beef, pork, fish, etc. These oils may be employed alone or in combination with one another. Generally, these oils will have a melting point in the range of from about −18° C. to about 25° C. Preferably, the melting point is in the range of from about 0° C. to 20° C. The employment of a particular oil having a specific melting point will generally be dictated by the specific end use intended for the capsules employing this oil.

The first criterion in the preparation of the stable emulsion is the proportion of the edible oil to the aqueous essence that is utilized, taking into account that a higher oil content and a correspondingly lower aqueous essence content will seriously limit the amount of flavorant and/or aromatic principles in the capsule (assuming, of course, that such principles are derived from the aqueous component of the emulsion) and that a lower oil content approaches the proportion at which the emulsion becomes more difficult to prepare.

In practice, emulsions with oil contents as high as 80% and as low as 25% by weight are suitable, preferably 50% or below. Such emulsions may be pressurized and/or sprayed without breakdown. If it is desirable to employ an amount of oil which is less than 30% by weight, it is then frequently necessary to include emulsifiers and/or stabilizers which are well known to those skilled in the art. With the employment of emulsifiers, an emulsion can be prepared having as little oil as 25% by weight. Emulsifiers such as monoglycerides, diglycerides, polysorbates, etc., may be employed. The selection of particular emulsifiers will generally depend upon the composition of the core material, particularly, the type of oil employed. Thus, for an oil-in-water emulsion where corn oil is employed, for example, an HLB (hydrophilic-lipophilic balance) of 10 is desired. Where soybean oil is employed in the same type of emulsion, an HLB of 6 is desired. Generally, a combination of two or more types of emulsifiers is employed to obtain a desired HLB number. The emulsifiers may be employed in an amount of up to 10% by weight based on the weight of the oil present.

The temperature is another important factor in the preparation of the stable emulsion. As the temperature rises, the emulsion becomes less stable. Accordingly, advantageous temperatures that are to be employed during the preparation of the emulsion and during its storage, i.e., until it is employed in the next step of the preparation of the capsules, are within the range of 0 to 40° C., and preferably, at ambient temperature (around 20° C.).

The stability of the emulsion can be determined by placing the emulsion to be tested in a 100 milliliter graduated cylinder and observing the amount of break in the emulsion after a 24 hour period at ambient temperature. The stability is reported as either the percentage of oil that has separated from the emulsion and is present at the top or the percentage of water that is present at the bottom. If no oil or water is separated, the amount of local breakdown, or as it is commonly known "checking" is recorded. Generally, an emulsion can be considered stable if the percentage of oil at the top or the percentage of water at the bottom is no more than 4 to 10%.

Once the stable emulsion is prepared, it is then ready to be employed in the next step of the process which involves adding the emulsion to powdered edible protein material, powdered edible carbohydrate material or powdered edible material comprised of a combination of proteins and carbohydrates. This powdered edible material eventually becomes the hardened walls or shell of the capsules that are produced in the present invention. In order to obtain capsules having desirably hardened, continuous impervious shells, the wall material that is employed should possess a number of specific characteristics. Firstly, the wall material should be able to pass throuoh at least a 250 μm screen (60 U.S. Standard Mesh). More finely powdered wall material may also be employed. Generally, the dimensions of the wall material powder particles will range from 60 μm (230 U.S. Standard Mesh) to 150 μm (100 U.S. Standard Mesh).

Secondly, in addition to being finely powdered, the particles should also be advantageously irregular in shape. Thus, material that has been spray dried or which is inherently spherical, is not desirable and should first be ground to obtain irregularly shaped particles. Such particles provide more contact points, i.e., greater surface area for contact with the core material that is added which correspondingly aids in the development of good capsule formation. Thirdly, the wall material should also be relatively dry to be able to absorb moisture from the core material that is added to it, i.e., either the emulsion or the frozen aqueous essence (which we discuss more fully hereinbelow), which is required in order to produce the shell from the powdered material. Generally, the moisture content is preferably in the range of from about 1.5 to 8.0% by weight and more preferably, less than 3% by weight.

In addition, the wall material should also be able to readily dissolve both in cold and hot water. This characteristic is important not only for enabling the capsule to easily release the encapsulated flavor and/or aromatic principles but is also important in actually forming the capsule itself.

Furthermore, the wall material should also be free flowing and able to be easily agitated without lumping or sticking.

Lastly, the wall material should also desirably have the property, after being wetted and dried, of forming a glassy-like structure thereby providing an essentially impervious shell about the core material.

Generally, the wall materials that may be employed include edible protein material, edible carbohydrate material or an edible material comprised of a combination of proteins and carbohydrates or combinations of all these materials. Typically, such materials may include instead coffee solids, instant tea solids, instant chicory, tomato solids, corn syrup solids, modified food starch, malto dextrin, corn dextrin, enzymatically hydrolyzed cereals, gums, water soluble proteins such as casein, whey proteins, etc., applicable water soluble solids extracted from food materials, and combinations thereof.

The emulsion may be added to the wall material by any one of a number of techniques in order to form the desired capsule. Thus, the emulsion may be added to the wall material by "dropping", "spraying", or by first "freezing" the emulsion and then adding the particulated frozen emulsion to the wall material. Without wishing to be bound by theory, no matter which method is employed, the mechanism for forming the capsules is believed to be as follows. Once the droplet of emulsion is added to the wall material and agitated, the water from the aqueous portion of the emulsion dissolves the surrounding wall material. Upon continued agitation with or without the incorporation of additional heat, the dissolved wall material will begin to dry and form a shell. As more water is freed from the core material, a thicker and stronger shell is formed. Eventually, the remaining powdered wall material will desiccate the water from the shell of the capsule leaving a hardened shell surrounding a droplet of oil containing the aroma and/or flavor constituents. Encapsulation is complete when the water flux ceases.

There are various factors which affect the rate of transfer of water from the core material into the powdered wall material. If the water transfer is too fast, the capsules that are formed are not entirely closed thereby allowing core material to leach through the capsules. On the other hand, if the transfer of water is too slow, this is economically undesirable and results in an unduly long curing time. Moreover, an undesirably thinner wall also results from such a slow transfer rate.

One of the factors which controls the rate of water transfer into the wall material is the stability of the emulsion itself. The more stable the emulsion, the more it is able to "hold on to" the water and control the rate of water transfer. In the case where the emulsion is first frozen and then added to the powder, the rate of water transfer is controlled even greater for water, as such, does not begin to dissolve the surrounding wall material until the frozen particulated emulsion material begins to thaw.

An additional factor affecting the rate of transfer is the temperature at which the process is conducted. The temperature should be low enough to prevent vaporization of any volatiles that may be present in the core material. Generally, the specific temperature employed depends upon the nature of the particular materials being used. Ambient temperature is preferred.

Finally, the hygroscopic nature of the powdered wall material also influences the rate of water transfer from the emulsion to the wall material.

One of the methods by which capsules are formed is by "dropping" droplets of emulsion onto a bed of agitated powdered wall material. By further agitation of these droplets in the powder, capsules are formed which after separation by conventional methods may be incorporated as such into various instant foods, depending upon the composition of the particular capsule.

In a variant, the capsules are dried after the initial coating of the droplet with the powdered wall material. A heat source such as a heat lamp or a hot air fluidized bed may be used for that purpose. Alternatively, drying may be accomplished by allowing the wall material to absorb the water from the emulsion and shell at room temperature over a period of time, for instance a few days. This dropping technique yields rather large capsules in the order of about 2.0 to 3.5 mm which have impervious walls and contain large amounts of aromatized and/or flavored oil within their interiors.

Smaller capsules may be prepared by spraying the emulsion of oil and aqueous essence onto a bed of agitated fine wall material. Various sizes of capsules, ranging from 250 $\mu$m to 2.0 mm, are obtained depending upon the particular spraying device employed. These capsules desiccate faster than the 2.0 to 3.5 mm capsules. Typically, the curing time for this alternative embodiment is in the range of from 1 hour to overnight for the larger capsules. By spraying the emulsion onto an agitated bed of finely powdered wall material at 50° C., the capsules formed desiccate rapidly, within minutes after they have been produced.

Where very accurate control of the size of the finished capsules is desired, the "freezing" embodiment is advantageously employed. Here, the emulsion is first frozen at $-80°$ C., for instance, ground, sized, and then the particulated frozen emulsion is added to the powdered wall material. In a preferred embodiment, the frozen emulsion particles are first exposed to water vapor prior to contacting the powdered wall material. This gives the particles an external coating of water which aids in the formation of the desired capsules. Capsules can be produced ranging in size from 250 $\mu$m to 3.5 mm.

In each of the above techniques, the curing step, during which the capsules are actually formed, involves the agitation of the powdered wall material, with or without heat, until the water flux ceases. The curing time is primarily dependent upon the ultimate capsule size.

Generally, the ratio of the amount of emulsion added to the powdered wall material is in the range of from about 1:4 to 1:50.

The embodiments discussed thus far include the formation of capsules in which an emulsion is employed for producing capsules for consumer products in which the presence of oil is desirable. Such products include instant coffee, instant soups, instant lunches, convenience foods such as frozen dinners, frozen pastries, frozen pizzas, etc. However, there are many instant food products in which the presence of oil in the final product would be objectionable and yet, where it would still be desirable to encapsulate various aromatic and/or flavorant constituents to be employed in such a product. Accordingly, in an alternative embodiment of the present invention, capsules containing these aromatic and flavor constituents are prepared without, however, the presence of oil.

Thus, in this embodiment of the present invention, an aqueous essence is employed alone as the core material. In general, this aqueous core is treated so as to form frozen particles thereof and is then added to powdered wall material where, by controlling the rate of thawing, the aqueous core dissolves the surrounding wall material forming a hardened shell, after curing, having impregnated therein the flavor and/or aromatic constituents originally contained in the aqueous solution surrounding a hollow internal core.

The particulated frozen aqueous core material may be formed in a number of different ways. In one alternative, the aqueous solution of core material is sprayed by a pump inside a tower maintained at a temperature cold enough to freeze the aqueous core. Generally, the temperature is maintained in the range of from about $-190°$ to $-10°$ C., and preferably is less than about $-40°$ C. The aqueous solution is sprayed in an upward direction inside the tower. As the stream reaches its highest point, it breaks into small droplets. The droplets then travel downwards and freeze before reaching the collector at the bottom. The frozen particles are then sprinkled into a well-agitated bed of powdered wall material and then cured until the capsules are formed.

In an alternative technique, the aqueous core material is frozen as a slab by means of, for example, a chilled conveyor belt. The frozen slab is then ground to a desired size that will correspond to the ultimate capsule size. Advantageously, the ground frozen particles are tempered so as to eliminate their sharp corners which may undesirably affect capsule formation and provide smooth spherical shaped particles. Tempering may be accomplished by stirring the particles in a jacketed container or by letting the frozen particles free-fall in a warm environment for a given amount of time. The tempered particles are then added to powdered wall material as above.

All of the process parameters and materials that were discussed above in connection with the formation of capsules employing an emulsion as the core material are also applicable in this embodiment where oil is objectionable. Thus, both the aqueous core material and the wall materials can be comprised of the very same materials discussed above. Similarly, as with the employment of the frozen emulsion, capsule size in this alternative embodiment is determined by the size of the frozen particles added to the powdered wall material. Curing is determined by the size of the capsules produced, the temperature of the environment and the nature of the wall material employed.

If desired, when employing either an emulsion or an aqueous essence alone as the core material, a humectant such as glycerol, propylene glycol, etc., may be added to the core material so as to aid in prolonging the shelf life of the resultant capsules.

All of the various alternative techniques discussed above for preparing the capsules of the present invention may be carried out in either a batch or continuous manner.

The capsules that are formed by the process of the present invention may be combined with the ultimate consumer product in a variety of different ways.

With coffee, for example, capsules comprising a hardened shell of coffee and/or coffee substitute solids surrounding a droplet of coffee oil containing coffee aroma may simply be mixed with instant coffee powder involving simple concealment of the capsules in the instant coffee, preferably after screening, for instance, through a 2.35 mm (8 U.S. Mesh) screen. If desired, up to 20% of the final product can be comprised of the capsules with no obvious detection. Advantageously, capsules are added which do not have a clean surface and still have excess powder clinging thereto. This insures an even coloring of the final product.

Alternatively, the coffee capsules may be agglomerated with the fine particles which are produced during spray-drying of coffee extract, or which are obtained by grinding prior to agglomeration.

In yet another alternative, coffee capsules may also be mixed, in the production of freeze-dried extracts, with concentrated coffee liquor prior to freezing and grinding. In this method, the capsules should desirably be small and numerous enough for the percentage broken or damaged by the grinder to be of little significance. An average size of capsules between 250 and 600 $\mu$m is preferred.

The level of coffee capsule incorporation into instant coffee may vary within wide limits, typically from 1 to 10%, depending upon the size of the capsules themselves. As a general rule, the smaller the coffee capsules, the greater the proportion that may be utilized in the instant coffee.

In the preparation of other instant foods, for example, instant soup, capsules containing the flavor and/or aromatic constituents of vegetables and beef may be added to such instant food by dry mixing. Generally, the amount of flavorant capsules added to such an instant food product will be in the order of about 0.2 to 5% by weight.

Generally, the amount of flavorant capsules added to a consumer product can vary from as little as 0.01% to as much as 10% by weight. The amount of flavorant capsules which is added to a particular product is generally dependent upon the desired level of flavor and/or aroma that is to be imparted to the food product and the flavor and/or aromatic strength of the particular capsules.

The capsules produced by the present invention will have a shelf-life of about twelve months. During that time, an intact capsule will have essentially no aroma of its own. It is not until the capsule is contacted with either hot or cold water (or actually physically broken) that a large burst of aroma (with or without flavorant) is given off. Depending upon the particular wall material employed, the size of the capsule and the temperature of the water, the dissolution of the capsules may take anywhere in the range of from about 2 seconds to about 2 minutes. While encapsulated, the flavor and/or aromatic constituents are effectively protected from the environment against deteriorating influences and are not released until desired.

Having described the basic concepts of this invention, the following Examples are set forth to illustrate the same. They are not, however, to be construed as limiting the invention in any manner. In the Examples, ratios and percentages are given by weight.

EXAMPLE 1

A core formulation is prepared employing an edible oil/aqueous essence ratio of 1:2 having the following formulation:

| | |
|---|---|
| Corn Oil | 100 grams |
| Onion Flavor (Water Base) | 200 grams |
| Emulsifiers | 12 grams |

An emulsion is prepared from the core material by homogenizing the same in a high shear mixer such as a Tekmar mixer for one minute. The emulsion is kept at 25° C. and no significant breakdown is noticeable after 72 hours.

The wall material employed consists of 50% by weight Frodex 24D (modified corn syrup solids) and 50% by weight of Nadex 772 (modified starch) having a total moisture content of 5% by weight and ground such that it is able to pass through a 100 μm screen (140 U.S. Mesh).

The capsules are prepared by allowing droplets of the emulsion to fall from a Pasteur pipette onto the surface of the Frodex/Nadex powder with an emulsion/powder ratio of 3% by weight. By agitation of these droplets in the powder, capsules are formed which are dried by allowing the fine powder to desiccate the water from the emulsion and shell at room temperature over a period of several days (self-desiccation).

The onion flavored capsules produced have an average particle size from 1.7 to 2.5 mm.

The capsules are incorporated into an instant onion soup mix in an amount of 0.01% by weight. Upon the addition of hot water, the capsules release a burst of onion flavor and aroma.

EXAMPLE 2

A core formulation is prepared having an edible oil/aqueous essence ratio of 1:3. The core formulation comprises the following:

| | |
|---|---|
| Safflower Oil | 100 grams |
| Beef Flavor | 100 grams |
| Concentrated Beef Broth (Water Base) | 200 grams |
| Emulsifiers | 12 grams |

The core material is homogenized in a manner similar to that set forth in Example 1 to form a stable emulsion. This emulsion is then sprayed onto an agitated bed of 4.5 kgs of powdered Maltrin 100 (corn syrup solids), which passes through a 100 μm (140 U.S. Mesh) screen, from a distance of 20 cm from the nozzle. After a curing time of a few hours to allow for complete desiccation, about 350 grams of beef flavored capsules are obtained having a dimension of about 0.6 to 1.7 mm.

These beef flavored capsules are added to an instant lunch mix product where upon the addition of hot water, beef flavor and aroma are released.

EXAMPLE 3

The procedure and materials set forth in Example 2 are repeated with the only exception being that instead of safflower oil, olive oil is employed instead. The capsules produced in this Example appear and behave similarly to the capsules prepared in Example 2.

EXAMPLE 4

The procedure and materials employed in Example 2 are repeated with the only exception being that leek essence is employed instead of the beef flavor and concentrated beef broth. The emulsion is prepared in a similar manner and added to the Maltrin 100 powdered wall material by dropping. Approximately 400 grams of leek flavored capsules are prepared having a dimension of 0.6 to 1.7 mm. These capsules are employed in an amount of 2% by weight in an instant vegetable soup product.

EXAMPLE 5

A core formulation is prepared with an edible oil/aqueous essence ratio of 1:3.5 having the following formulation:

| | |
|---|---|
| Non-hydrogenated Cottonseed Oil | 100 grams |
| Shrimp Flavor Essence in a Glycerol Carrier | 200 grams |
| Water | 350 grams |
| Emulsifiers | 10 grams |

The core material is homogenized in a high shear mixer to form a stable emulsion.

4.5 kgs of a wall material consisting of modified starch is introduced into a rotating drum containing 1.3 cm baffles on the inner surface to provide good powder agitation. The emulsion is then sprayed onto the mixing bed of the agitated modified starch with a small piston pump to provide a spray pressure of 1.4 kg/cm$^2$ through a nozzle having an opening of $2.3 \times 10^{-5}$ cm. After the emulsion is sprayed into the rotary drum, the drum is sealed and allowed to continue tumbling for an additional 12 hours in order to cure the capsules.

600 grams of good, fully sealed shrimp flavored capsules are produced having a dimension of 0.6 to 1.7 mm. These capsules are employed in the preparation of a shrimp cocktail sauce in an amount of 0.1% by weight.

EXAMPLE 6

The procedure of Example 5 is repeated with the exception being that instead of curing the capsules in the rotary drum for 12 hours, the drum is mixed for only 1 hour. The curing is then completed by introducing the entire mixture of powder and partially formed capsules in a fluidized air bed to complete the curing step. The air temperature of the fluidized air bed is maintained at approximately 50° C. with an air flow rate of approximately 30 meters per minute. After 10 minutes in the fluidized air bed, the capsules are removed by increasing the air flow rate to approximately 100 meters per minute such that the excess powder is blown out leaving the cured fully formed capsules behind.

EXAMPLE 7

A core formulation is prepared employing 500 grams of tea essence alone. The tea essence is placed in a pan which is immersed in a dry-ice bath maintained at a temperature of about −80° C. for two hours.

The frozen slab of tea essence is then ground in a grinder and then sifted on 2.0 mm and 0.6 mm (10 and 30 U.S. Mesh) sieves. The particles (between 0.6 mm and 2.0 mm) are then tempered by constantly stirring these particles to smooth their sharp edges. The tempered particles are then sprinkled, employing a sifter, into a mixing pan coater containing 4.5 kg of solubilized tea tannins employed as the wall material having a particle size of about 100 μm. The mixture is allowed to tumble for 24 hours to complete the curing step.

300 grams of capsules are produced having a dimension of about 0.6 to 2.5 mm. The tea flavored capsules are then employed in the preparation of an instant tea powder in an amount of 1.5% by weight. These capsules remain intact and do not release the tea essence flavor and/or aroma until either hot or cold water is added thereto.

EXAMPLE 8

Example 7 is repeated with the only exception being that instead of tempering the frozen particles in the manner set forth in Example 7, the ground frozen particles are exposed to a water vapor mist which smooths the sharp edges of the particles.

EXAMPLE 9

A core material consisting of lemon oil and concentrated lemon juice is upwardly sprayed in a tower against a stream of cold air having a temperature of about −100° C. and flowing at a rate of about 35 meters per minute. Frozen particles having a dimension of about 0.6 to 1.7 mm are collected at the bottom of the tower and are sprinkled into a rotating drum containing 100% chicory. The capsules produced have a dimension of 0.6 to 2.0 mm and may be employed in lemonade in an amount of from 0.15 to 0.25% by weight or in a lemon-flavored iced-tea mix in an amount of from 0.05 to 0.15% by weight.

The capsules produced are fully intact and completely sealed and do not release the lemon aroma and flavor until contacted with either hot or cold water.

EXAMPLES 10 TO 18

TABLE I

| Ex. | Method of Capsule Formation | Type of Drying | Capsule Size | Aromatized Oil Content |
|---|---|---|---|---|
| 10 | dropping | self desiccation | 2.35–3.25 mm | 35% |
| 11 | dropping | self desiccation | 2.35–3.25 mm | 35% |
| 12 | " | desiccation at 50° C. | " | 35% |
| 13 | " | heat lamp | " | 35% |
| 14 | " | "drying delayed" | " | 35% |
| 15 | spraying | self desiccation | full spectrum 420 μm–2.35 mm | 8–35% |
| 16 | " | desiccation at 50° C. | full spectrum 420 μm–2.35 mm | 8–35% |
| 17 | freezing | self desiccation | 1 mm | 20% |
| 18 | freezing with steam treatment | self desiccation | 1 mm | 20% |

COMMENTS

Preparation of the Emulsion

Ex. 10: An emulsion of coffee oil/coffee distillate is prepared by shaking together in a closed jar 1 part of coffee oil (obtained by extraction from spent grounds) with 1 part of a coffee distillate. After homogenization, this emulsion is allowed to stand and is kept at 25° C. No significant breakdown occurs with time, up to 24 hours.

All Other Examples (Examples 11-24): Coffee oil is recirculated through a series of three 1 cm diameter stationary mixing elements at pressures up to 10 atm, the distillate being slowly added into the stream until the desired 1/1 coffee oil/distillate ratio is obtained. The emulsion is kept at 25° C. and no significant breakdown is noticeable after 72 hours.

Dropping

Ex. 10 and 11: The capsules are prepared by allowing droplets of the emulsion to fall from a Pasteur pipette onto the surface of a bed of 150 μm (100 U.S. Mesh) fine coffee powder having a moisture content of 3% by weight with an emulsion/powder ratio of 5% by weight. By agitation of these droplets in the powder, capsules are formed which are dried by allowing the fine powder to desiccate the water from the emulsion and shell at room temperature over a period of several days (self-desiccation).

Ex. 12: The capsules are dried within a few hours by allowing the fine powder to desiccate the water from the emulsion and shell at a temperature of 50° C.

Ex. 13: The capsules are dried within 1 to 2 hours by rotating the capsules in the fine powder at room temperature under a heat lamp.

Ex. 14: The capsules are not dried and are separated from the fine powder by screening after the shells have developed sufficiently for mechanical handling. Capsules are obtained which have an excess powder clinging to them and are dried by contact with the final instant coffee powder (drying delayed).

Spraying

Ex. 15: A spray of the emulsion is directed onto an agitated bed of fine coffee powder at a distance of 20 cm from the nozzle. The capsules obtained by contact with the fine powder desiccate within a few hours.

Ex. 16: The capsules are obtained as described in the preceding Example, the fine powder being maintained at 50° C. They desiccate within minutes.

Freezing

Ex. 17: The emulsion is fast-frozen at −80° C. and ground in dry ice with a blender. Addition of frozen particles to agitated fine powder yield capsules which desiccate in just slightly longer time than comparable size capsules from dropping and spraying. The slight extra time is required to allow the capsules to rise to ambient temperature.

Ex. 18: As in Ex. 17, except that the frozen emulsion particles are coated with water vapor before addition to the fine powder.

EXAMPLES 19 AND 20

Ex. 19: The capsules are prepared by adding droplets of the emulsion from a Pasteur pipette onto the surface of less than about 100 μm (140 U.S. Mesh) fine instant chicory powder having a moisture content of 5.3% by weight, with an emulsion/powder ratio of 3% by weight. By agitation of these droplets in the powder, capsules are formed which are dried by allowing the fine powder to desiccate the water from the emulsion and shell at room temperature over a period of several days (self-desiccation).

Ex. 20: The procedure of Example 19 is repeated with a powder consisting of 50/50 mixture of coffee and chicory solids less than about 100 μm (140 U.S. Mesh) with a moisture content of 5.2%. The emulsion/powder ratio is 3%. The capsules have a hard shell and are practically indistinguishable from capsules produced from coffee powder.

EXAMPLES 21 TO 24

Ex. 21: Capsules as prepared in Example 14 and having excess powder clinging to the surface are blended with a regular freeze-dried instant coffee in an amount depending on the size of capsules and listed in Table II set forth below. An instant coffee is thus obtained with no obvious detection of the capsules.

Ex. 22: The procedure of Example 21 is repeated with a spray-dried coffee using capsules with proportionally smaller dimensions.

Ex. 23: In a conventional process of agglomeration used for the preparation of regular instant coffee, capsules as prepared in Example 15 are added to the fines which are recycled into the agglomeration tower (see proportions in Table II). An instant coffee containing capsules is obtained although these capsules are not easily detectable in the product.

Ex. 24: In a conventional process for preparing freeze-dried coffee, small capsules as described in Example 15 are added (see proportions in Table II) to the concentrated extract just before freezing. The capsules become part of the frozen mix which is then processed in the normal way until instant freeze-dried coffee is obtained.

TABLE II

| Capsules Dimensions | Percent of Capsules in Instant Coffee, By Weight |
|---|---|
| 420–600 μm | 7.2 |
| 600–850 μm | 4.6 |
| 850 μm–1.20 mm | 3.2 |
| 1.20–1.70 mm | 2.3 |
| 1.70–2.35 mm | 1.8 |
| 2.35–3.35 mm | 1.4 |

We claim:

1. Flavorant capsules having a particle size of from 250 μm to 3.5 μm comprising a continuous hardened, impervious shell of edible protein material, carbohydrate material or a combination of protein and carbohydrate material having a wall thickness of from about 20 μm to 400 μm and having impregnated therein a flavor and/or aroma essence, derived from a frozen aqueous solution of the flavor and/or aroma essence, surrounding a hollow core empty of flavor and/or aroma essence.

2. Flavorant capsules produced by a process which comprises:
   (a) adding particulated frozen aqueous flavor and/or aroma essence solution to a powdered wall material, having a particle size of from 60 μm to 150 μm, in a ratio of from 1:4 to 1:50 by weight of particulated frozen aqueous essence solution to powdered wall material, said wall material being selected from the group consisting of edible proteins, carbohydrates and combinations thereof, and forming by agitation at ambient temperature a continuous coating layer of the wall material on the frozen aqueous essence solution and allowing a water flux from the frozen aqueous essence particle to the surrounding wall material;
   (b) curing the coated particles by continuing agitation until the water flux ceases such that the wall thickness is from about 20 μm to 400 μm surrounding a hollow core and such that the aqueous flavor and/or aroma essence solution is impregnated within the wall material; and then
   (c) collecting the capsules having a particle size in the range of from 250 μm and 3.5 μm.

* * * * *